May 26, 1931.  E. E. FISHER  1,806,994
TRACK BRAKE
Filed July 21, 1930  2 Sheets-Sheet 1

INVENTOR.
EMMETT E. FISHER,
BY
Lockwood Lockwood Goldsmith & Galt
ATTORNEYS.

May 26, 1931.  E. E. FISHER  1,806,994
TRACK BRAKE
Filed July 21, 1930  2 Sheets-Sheet 2
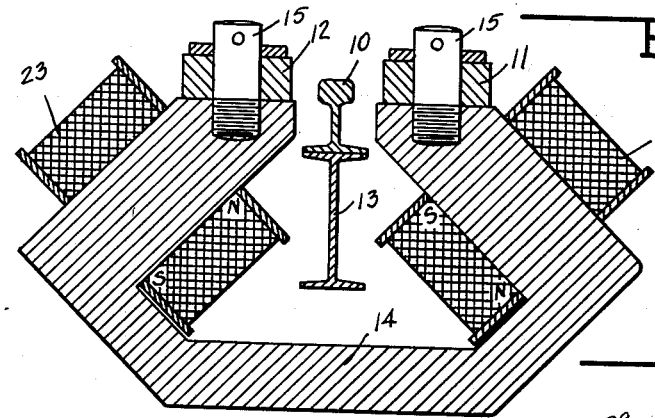
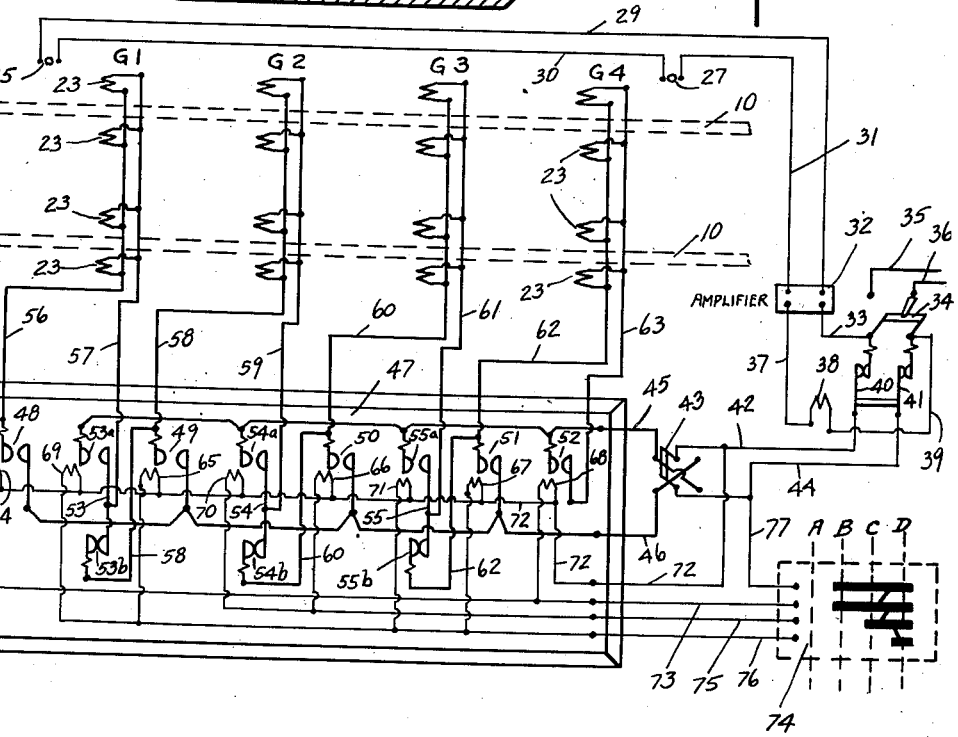
INVENTOR.
EMMETT E. FISHER,
BY
Lockwood Lockwood Goldsmith & Gill
ATTORNEYS.

Patented May 26, 1931

1,806,994

UNITED STATES PATENT OFFICE

EMMETT E. FISHER, OF INDIANAPOLIS, INDIANA

TRACK BRAKE

Application filed July 21, 1930. Serial No. 469,603.

This invention relates to a track brake particularly for use in railroad classification yards.

One object of the invention is to provide a track brake having the fewest possible moving parts and the simplest control mechanism. The track brake herein described requires a minimum amount of attention for the maintenance of operating efficiency.

Another object of the invention is to provide a track brake of the magnetic type wherein a brake shoe is applied to the wheels of a car travelling upon a track to give both a frictional retarding force and a magnetic retarding force to the wheels. The parts are so arranged that little or no attractive force is exerted upon the wheels when entering the magnetic field of the brake shoe but a large retarding effect is produced upon the wheels when leaving the said magnetic field.

One feature of the invention by which these objects are obtained resides in the provision of one or more brake shoes arranged longitudinally of the track and mounted for pivotal movement about a substantially vertical axis. The said brake shoe or shoes are the only moving parts and the pivotal mounting thereof is the only point requiring complete lubrication. In the types of magnetic and mechanical track brake heretofore proposed, movable brake shoes have been mounted for movement about horizontal axes requiring a large number of bearings and hence a much greater amount of maintenance attention.

Another feature of the invention resides in the arrangement of parts by which the brake shoe is normally a part of a closed magnetic circuit until engaged by the wheel of a car. When so engaged by the wheel, the said circuit is broken and the wheel itself becomes a part of the magnetic circuit. In the approach of the wheel, therefore, since the magnetic circuit is already closed, there is a relatively small magnetic attraction exerted upon the wheel. In leaving the brake shoe, the wheel is a part of the magnetic circuit and, therefore, a relatively greater retarding effect is produced upon the wheel.

Certain features of the invention herein disclosed but not claimed are disclosed and claimed in my co-pending application Serial No. 440,935, filed April 2, 1930.

Figure 1:
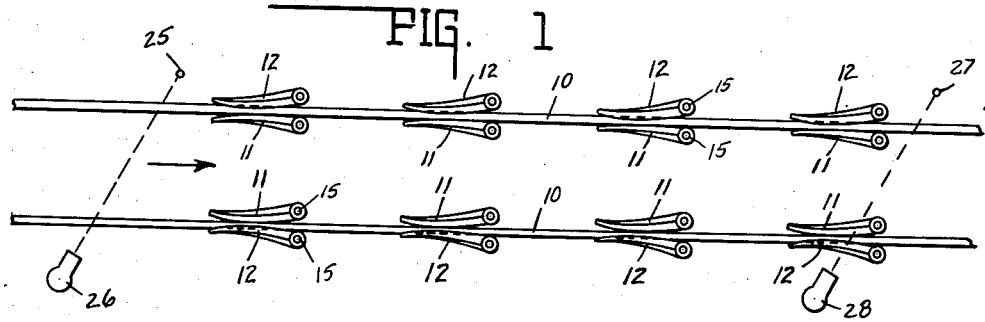
Figure 2:
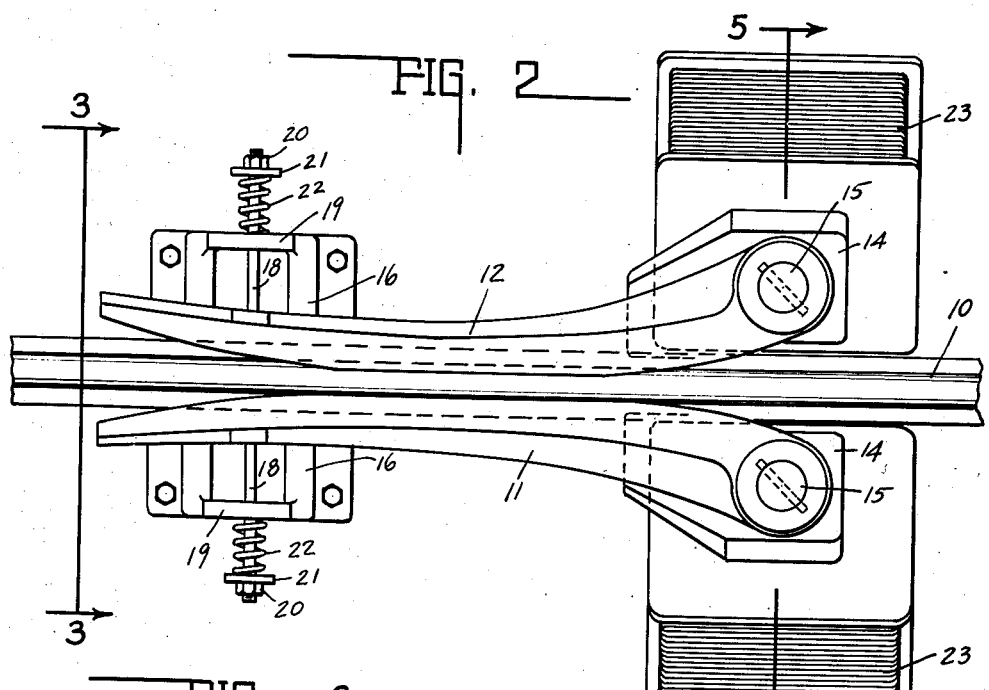
Figures 3, 4:
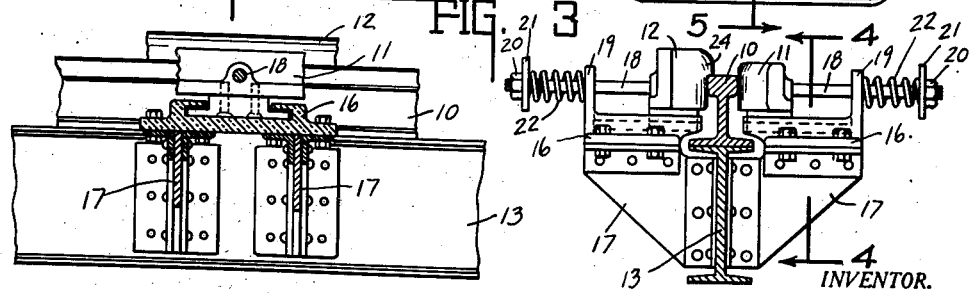

Other objects and features of the invention will be understood from the accompanying drawings and the following description and claims:

Fig. 1 is a plan view of a section of track having four pairs of brake shoes applied to each rail. Fig. 2 is a plan view of one pair of brake shoes and associated mechanism drawn to a larger scale than Fig. 1. Fig. 3 is a sectional view taken on the line 3—3 of Fig. 2. Fig. 4 is a sectional view taken on the line 4—4 of Fig. 3. Fig. 5 is a sectional view taken on the line 5—5 of Fig. 2. Fig. 6 is a diagram of electrical connections for controlling the operation of the said brake shoes.

In Fig. 1 a pair of rails 10 have arranged on the inner sides thereof brake shoes 11 and on the outer sides brake shoes 12. The rails 10 preferably form a part of the track on the downward side of the distribution hump commonly used in freight yards. However, similar apparatus may be installed on the distribution tracks or on the lead-in tracks leading to the distribution tracks. The normal direction of car motion in distribution operation is indicated by the arrow in Fig. 1. The rails 10 are preferably supported upon I-beams 13. A plurality of magnet cores 14 extend about the rails 10 and I-beams 13 and each pivotally supports one of the brake shoes 11 and one of the brake shoes 12 as shown in Fig. 5. Vertically-extending pins 15 inserted in the poles of the cores 14 furnish the said pivotal mounting. The opposite ends of each of the brake shoes 11 and 12 are slidably supported upon guides 16 preferably formed of non-magnetic material. The guides 16 rest upon brackets 17 carried by the I-beams 13. A rod 18 is fastened to each of the brake shoes 11 and 12 and extends through a suitable opening in an upwardly-extending flange 19 of the corresponding guide member 16. Each of the rods 18 carries a nut 20 and washer 21 serving as a seat for a compression spring 22. Each of the springs 22 abuts at its opposite end against the corresponding flange 19.

Each of the magnet cores 14 has associated therewith a pair of electromagnetic windings 23.

In this construction, the only moving parts are the brake shoes and the rods 18 carried thereby. The sliding support of the said shoes upon the guide members 16 presents little opportunity for friction and, therefore, requires a small amount of maintenance attention. The pivotal mounting of the said brake shoes requires more efficient lubrication which may be obtained by packing the same in grease and providing a suitable covering or by any other approved method of lubrication.

As shown in the drawings, the inner brake shoes 11 abut directly against the inner side of the ball of the rail 10 while the outer shoes 12 abut against the outer side of the ball of the rail and have a portion 24 extending above the rail to engage the outer edge of a wheel of a car travelling upon the rail. When the magnets 23 are energized, complete magnetic circuits are therefore formed through the cores 14, the shoes 11 and 12 and the rail 10. The ends of the shoes 11 and 12 are outwardly flared as shown in Fig. 2 to permit the entrance of a wheel therebetween. Since there is already a closed magnetic circuit at the approach of a wheel, the attractive force exerted by the magnetic field upon the wheel is relatively small. As the wheel engages the shoes, however, they are forced apart and disengaged from the rail. The inner shoes 11 engage the flange of the wheel and the outer shoes 12 engage the outer edge of the wheel. The wheel is, therefore, substituted for the rail in the magnetic circuit. During the passage of the wheel between the shoes, the magnetic attraction therebetween causes the exertion of a frictional retarding force upon the wheels. In addition, as the wheel leaves the shoes, there is a strong magnetic retarding force due to the breaking of the magnetic circuit. When the magnets 23 are deenergized, the springs 22 act to withdraw the shoes from the rail against the force of the residual magnetism contained therein. In this position, the shoes do not engage a wheel travelling upon the rail and, therefore, exert no retarding force thereon.

A preferred form of apparatus for controlling the action of the magnets 23 is diagrammatically shown in Fig. 6 and certain portions thereof are indicated in Fig. 1. A photoelectric cell 25 is placed at one side of the track near the entrance end of the brake mechanism. At the opposite side of the track there is placed a source of light 26 adapted to project a beam upon the photoelectric cell 25. A similar photoelectric cell 27 and source of light 28 are similarly placed near the exit end of the brake mechanism. The said cells and light sources are placed at an elevation such that a beam of light therebetween is interrupted by the deck of a standard size flat car. When so placed, the beam is also interrupted by a portion of any other type of freight car. As shown in Fig. 1, the position of the source of light is such that the beam is projected diagonally across the track. When two coupled cars are moving upon the track, the beam can not pass between the cars and the interruption of the beam is continuous. When a single car is run through the brake mechanism, the front end thereof interrupts the beam of light impinging upon cell 27 before the rear end clears the beam impinging upon cell 25. Thus one or the other of the said beams is interrupted from the time that the front end of the car approaches the brake mechanism until the rear end has left the said mechanism.

The cells 25 and 27 are connected in series by means of wires 29, 30 and 31 to an amplifier 32. The said amplifier is connected by a wire 33 with one terminal of a cutout switch 34 in turn connected to power lines 35 and 36. The amplifier 32 is also connected by a wire 37 to one terminal of a magnet 38, the opposite terminal of which is connected by a wire 39 to the opposite terminal of the switch 34. The magnet 38 is adapted, when energized, to open a pair of normally closed contactors 40 and 41, each of which is connected to one terminal of the switch 34. The amplifier is so adjusted with relation to the cells 25 and 27 and the magnet 38 that sufficient current for operating the magnet 38 is available only when both cells 25 and 27 receive light from their corresponding light sources. Therefore, if the beam from either light source is interrupted by a freight car, the magnet 38 is deenergized and the contactors 40 and 41 are closed.

The contactor 40 is connected by a wire 42 to one terminal of a reversing switch 43. The contactor 41 is similarly connected by a wire 44 to another terminal of the said switch. Wires 45 and 46 lead from switch 43 to a plurality of magnetic contactors carried upon a switch board 47. The switch 43 is so constructed that wire 42 may be connected to wire 45 and wire 44 to wire 46 or vice versa, as desired. This switch serves as a means of reversing the current in magnets 23 for removing residual magnetism from the brake shoes as will be hereinafter made apparent.

The switch board 47 carries single pole normally open magnetic contactors 48, 49, 50, 51 and 52 and double pole magnetic contactors 53, 54 and 55. The contactor 53 consists of a normally open contact element 53a and a normally closed contact element 53b. The contactor 54 consists of normally open contact element 54a and normally closed contact element 54b. A contactor 55 consists of normally open contact element 55a and normally closed contact element 55b. The wire 45 is connected to one terminal of each of the contact elements 53a, 54a, 55a and 52. A wire 46 is connected to one terminal of each of the contact elements 48, 49, 50 and 51. A section of the track 10 is shown also in Fig. 6 and four groups G1, G2, G3 and G4 of the magnets 23 are indicated thereon. The group of magnets G1 is connected by wire 56 to contact element 48 and by wire 57 to contact element 53a and 53b. The group of magnets G2 is connected by a wire 58 to contact elements 49 and 53b and by wire 59 to contact elements 54a and 54b. The group of magnets G3 is connected by wire 60 to contact elements 50 and 54b and by wire 61 to contact elements 55a and 55b. The group of magnets G4 is connected by wire 62 to contact elements 51 and 55b and by wire 63 to contact element 52.

The contactors 48, 49, 50, 51 and 52 are closed by the energizing of magnets 64, 65, 66, 67 and 68 respectively. The contactor 53 is actuated to close contact element 53a and open contact element 53b by the energizing of a magnet 69. The contactor 54 is actuated to close contact element 54a and open contact element 54b by the energizing of a magnet 70. The contactor 55 is actuated to close contact element 55a and open contact element 55b by the energizing of a magnet 71. One terminal of each of the magnets 64 to 71 inclusive is connected by a wire 72 to the wire 42. The opposite terminal of each of magnets 64 and 68 is connected by a wire 73 to one terminal of a drum controller 74. The second terminal of magnets 70 and 66 are similarly connected by wire 75 to another terminal of the said drum controller. The second terminal of each of the magnets 69, 65, 71 and 67 are similarly connected by a wire 76 to another terminal of the said drum controller. A fourth terminal of the drum controller 74 is connected to wire 44 by means of a wire 77. The controller 74 is of a common drum type having four controller positions indicated diagrammatically by the letters A, B, C and D. In the position A, no electrical connection is formed between any of the terminals of the controller. In position B, wires 73 and 77 are connected together. In position C, wires 75, 73 and 77 are connected together. In position D, wires 76, 75, 73 and 74 are all connected together.

In the operation of this control apparatus, electrical current is supplied at a constant potential upon the power lines 35 and 36. When the switch 34 is closed, current is provided for the amplifier 32, the magnet 38 and the photoelectric cells 25 and 27. If it is desired to pass a car along the track without braking, the controller 74 is placed in the A position, at which position none of the magnets on the panel board 47 are energized and no circuits are formed for energizing the magnets 23. If it is desired to apply a moderate braking force to a car, the controller 74 is placed in the B position. When a car approaches the braking apparatus and interrupts the beam of light impinging upon the photoelectric cell 25, the magnet 38 is de-energized and the contactors 40 and 41 are closed. When this occurs with the controller in the B position, magnets 64 and 68 are energized to close contactors 48 and 52 by means of the following circuit: 35, 34, 40, 42, 72, 64 and 68, 73, 74, 77, 44, 41, 34 and 36. The closing of contactors 48 and 52 forms a circuit for the energizing of all of the magnets 23 as follows: 35, 34, 40, 42, 43, 45, 52, 63, G4, 62, 55b, 61, G3, 60, 54b, 59, G2, 58, 53b, 57, G1, 56, 48, 46, 43, 44, 41, 34, 36. In this circuit the four groups of magnets 23 are in series. Therefore, each group receives one-fourth of the voltage supplied upon lines 35 and 36. With this voltage only a moderate braking force is applied to the car. The magnets 23 remain energized until the car or cars clear the beam of light impinging upon cell 27 whereupon magnet 38 is energized and the circuit is broken.

When it is desired to apply a greater braking force to a car, the controller 74 is placed in the C position. When a car approaches the braking apparatus with the controller in this position, the magnets 64 and 68 are energized by the same circuit as before. In addition, the magnets 70 and 66 are energized to close contactors 54a and 50 and to open contactor 54b by a similar circuit using wire 75. The operation of the contactors 54a, 54b and 50 together with the operation of the contactors 48 and 52 forms two circuits for the energizing of the magnets 23. The first of these circuits is as follows: 35, 34, 40, 42, 43, 45, 52, 63, G4, 62, 55b, 61, G3, 60, 50, 46, 43, 44, 41, 34, 36. The second circuit is as follows: 35, 34, 40, 42, 43, 45, 54a, 59, G2, 58, 53b, 57, G1, 56, 48, 46, 43, 44, 41, 34, 36. In each of these circuits two groups of the magnets 23 are connected in series. Each group, therefore, receives one-half of the voltage supplied upon the power mains 35 and 36. Each brake shoe, therefore, exerts approximately twice the braking force upon the wheels as in the previous case.

When it is desired to exert a much greater braking force, as for example, when it is desired to stop a car in an emergency, the controller 74 is placed in the D position. With the controller in this position, the interruption of the beam of light to either of the photoelectric cells 25 and 27 causes the deenergizing of magnet 38 and closing of contactors 40 and 41 as before. The closing of these contactors energizes magnets 64, 70, 66 and 68 by the same circuits as before. In addition, the magnets 69, 65, 71 and 67 are also energized by similar circuits passing through the controller 74 and the wire 76. By the energizing of these magnets, all of the normally open contact elements on the panel board 43 are closed and all of the normally closed contact elements are opened. The action of these contact elements sets up four circuits for the energizing of the magnets 23 as follows: circuit 1,—35, 34, 40, 42, 43, 45, 53a, 57, G1, 56, 48, 46, 43, 44, 41, 34, 36. Circuit 2,—35, 34, 40, 42, 43, 45, 54a, G2, 58, 49, 46, 43, 44, 41, 34, 36. Circuit 3,—35, 34, 40, 42, 43, 45, 55a, 61, G3, 60, 50, 46, 43, 44, 41, 34, 36. Circuit 4,—35, 34, 40, 42, 45, 52, 63, G4, 62, 51, 46, 43, 44, 41, 34, 36. In each of these circuits one of the groups of magnets 23 is connected directly across the power lines 35 and 36 and, therefore, each of said groups receives the full voltage. By means of this large voltage, the emergency braking force is applied to the wheels.

While the foregoing specifications describe a preferred form of the brake mechanism and apparatus for controlling the same, certain features of the invention are independent of certain of the details herein shown which may, therefore, be varied without departing from the broader features of the invention. For example, the mounting of the brake shoes for movement about a vertical axis possesses utility whether applied with magnetic or mechanical actuating means. As another example, it is not necessary for certain features of the invention that the brake shoes actually engage the rail. It is possible that they may be made to engage some other form of mechanical stop which may take the place of the rail in forming a closed magnetic circuit before the entrance of a car.

The invention claimed is:

1. In combination with a rail upon which a wheeled vehicle may travel, a brake shoe adjacent said rail, and an electromagnet, said shoe and rail being adapted to form a closed magnetic circuit for said electromagnet and said shoe being mounted and shaped to permit movement thereof for the entrance of a portion of a wheel of said vehicle between said shoe and rail.

2. In combination with a rail upon which a wheeled vehicle may travel, a brake shoe pivotally mounted for movement about a substantially vertical axis and adapted to engage said rail, and an electromagnet, said shoe and rail being adapted to form a closed magnetic circuit for said electromagnet and said shoe being shaped to permit entrance of a portion of a wheel of said vehicle between said shoe and rail.

3. In combination with a rail upon which a wheeled vehicle may travel, a pair of brake shoes positioned upon opposite sides of said rail and adapted to engage said rail, and an electromagnet, said shoe and rail being adapted to form a closed magnetic circuit for said electromagnet and said shoes being so mounted and shaped that engagement of a wheel of said vehicle therewith moves said shoes from their engagement with said rail, whereby said wheel is substituted for said rail in the magnetic circuit.

4. In combination with a rail upon which a wheeled vehicle may travel, a pair of brake shoes positioned upon opposite sides of said rail, pivotally mounted for movement about a substantially vertical axis and adapted to engage said rail, and an electromagnet, said shoe and rail being adapted to form a closed magnetic circuit for said electromagnet and said shoes being so shaped that engagement of a wheel of said vehicle therewith moves said shoes about their pivotal mountings to break their engagement with said rail, whereby said wheel is substituted for said rail in the magnetic circuit.

5. In a rail brake, the combination of a pair of brake shoes positioned to engage opposite sides of a wheel of a vehicle travelling upon a rail, and an electromagnet, said shoes and rail being adapted to form a closed magnetic circuit for said electromagnet and said shoes being so mounted and shaped that engagement of said wheel therewith moves the same to permit inclusion of said wheel in said magnetic circuit.

6. In combination with the rail of a track upon which a wheeled vehicle may travel, a brake shoe adjacent said rail, an electromagnet, said shoe and rail adapted to form a closed magnetic circuit for said electromagnet, a stationary source of light on one side of the track projecting its rays across the track in the path of travel of a vehicle, a photoelectric cell on the opposite side of said track to receive rays from said light source, said light source and cell disposed beyond said shoe, and a source of current in circuit with said electromagnet and controlled by said cell.

In witness whereof, I have hereunto affixed my signature.

EMMETT E. FISHER.